United States Patent
Patil et al.

(10) Patent No.: US 10,999,738 B2
(45) Date of Patent: May 4, 2021

(54) DETECTION OF INTERNET-OF-THINGS DEVICES IN ENTERPRISE NETWORKS

(71) Applicant: Cisco Technology, Inc., San Jose, CA (US)

(72) Inventors: Santosh Ramrao Patil, Santa Clara, CA (US); Matthew Aaron Silverman, Shaker Heights, OH (US); Huaiyi Wang, Cuyahoga Falls, OH (US); Gangadharan Byju Pularikkal, San Jose, CA (US); Akram Ismail Sheriff, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/259,019

(22) Filed: Jan. 28, 2019

(65) Prior Publication Data
US 2020/0245148 A1 Jul. 30, 2020

(51) Int. Cl.
*H04W 12/08* (2009.01)
*H04W 4/80* (2018.01)
*H04W 74/08* (2009.01)
*H04L 12/46* (2006.01)
*H04W 84/12* (2009.01)

(52) U.S. Cl.
CPC ......... *H04W 12/08* (2013.01); *H04L 12/4641* (2013.01); *H04W 4/80* (2018.02); *H04W 74/0833* (2013.01); *H04W 84/12* (2013.01)

(58) Field of Classification Search
CPC .................................................. H04W 12/08
See application file for complete search history.

(56) References Cited

U.S. PATENT DOCUMENTS

| | | | |
|---|---|---|---|
| 9,806,902 B2 | 10/2017 | Srivastava et al. | |
| 9,949,130 B2 | 4/2018 | Ophir et al. | |
| 10,084,826 B1 | 9/2018 | Irwan et al. | |
| 10,097,358 B2 | 10/2018 | Robbins et al. | |
| 2005/0105485 A1* | 5/2005 | Cleveland | H04B 7/0617 370/320 |

(Continued)

OTHER PUBLICATIONS

Yair Meidan et al., "Detection of Unauthorized IoT Devices Using Machine Learning Techniques", arXiv:1709.04647v1 [cs.CR], Sep. 14, 2017, 13 pages.

(Continued)

*Primary Examiner* — Edan Orgad
*Assistant Examiner* — Won Tae C Kim
(74) *Attorney, Agent, or Firm* — Edell, Shapiro & Finnan, LLC (57) ABSTRACT

Techniques for identification and isolation of Internet-of-Things devices in an enterprise network are described. In one embodiment, a method includes detecting a plurality of devices having a first network interface to connect to a wireless wide area network and a second network interface to connect to an enterprise network. The method also includes identifying a first subset of the plurality of devices as Internet-of-Things (IoT) devices based on at least a detected repetition rate on a physical random access channel of a transmission made by a device of the plurality of devices. The method includes assigning the IoT devices to a separate network segment within the enterprise network.

20 Claims, 7 Drawing Sheets

(56) References Cited

U.S. PATENT DOCUMENTS

| | | | | |
|---|---|---|---|---|
| 2013/0344844 | A1* | 12/2013 | Goldfarb | H04L 63/1408 |
| | | | | 455/411 |
| 2016/0316491 | A1* | 10/2016 | Axmon | H04W 4/70 |
| 2018/0131689 | A1* | 5/2018 | Vasters | H04L 12/66 |
| 2018/0191756 | A1* | 7/2018 | Kaushik | H04L 63/1425 |
| 2019/0044948 | A1* | 2/2019 | Beals | H04W 12/0806 |
| 2019/0261197 | A1* | 8/2019 | Bellamkonda | H04W 24/02 |
| 2019/0288824 | A1* | 9/2019 | Chavva | H04L 5/0048 |
| 2019/0334865 | A1* | 10/2019 | Nagarajan | H04L 12/4633 |

OTHER PUBLICATIONS

Marlène Sellebråten, "Schindler partners with Huawei on connected elevator solution", https://enterpriseiotinsights.com/20160831/buildings/schindler-huawei-connected-elevator-solution-tag29, Aug. 31, 2016, 10 pages.

Jeffrey Lee, Cellular, Enterprise, "Why LTE is Finally Becoming a Reality for Enterprise IoT Applications", https://blog.particle.io/2018/05/01/why-lte-is-finally-becoming-a-reality-for-enterprise-iot-applications/, May 1, 2018, 8 pages.

Xerox®, "Xerox® Print Management and Mobility Service Information Assurance Disclosure", Software Version 4.0.2xx Version 1.2 702P04728, downloaded Jan. 11, 2019 from https://securitydocs.business.xerox.com/wp-content/uploads/2017/04/XeroxMobilityService_4_0_2xx_IAD_EN-v1_2.pdf, 39 pages.

Ulaky, Casey, "Protecting against the latest LTE network attacks", Jul. 6, 2018, 4 pages.

Kent, Robin, "Security threats in LTE: Devices, access, core elements and services", Jan. 5, 2015, 3 pages.

Paganini, Pierluigi, "Security issues in the LTE standard expose billions on mobile users to attacks", Jul. 1, 2018, 8 pages.

Huawei Technologies Co., Ltd., "NB-IOT, Accelerating Cellular IOT", https://www.huawei.com/minisite/hwmbbf15/en/nb-iot-accelerating-cellular-iot.html, Nov. 2-5, 2015, 4 pages.

* cited by examiner

DETECTION OF INTERNET-OF-THINGS DEVICES IN ENTERPRISE NETWORKS

TECHNICAL FIELD

This disclosure relates to computer network security.

BACKGROUND

The Internet of Things (IoT) generally refers to the devices and machines embedded with electronics and software enabling these devices and machines to exchange data over a network (e.g., the Internet). The number of IoT devices connected to networks worldwide is poised to grow rapidly. This rapid rise of IoT devices has resulted in steadily increasing numbers and types of special purpose network connected devices. It is possible that many of these special purpose network connected devices will have little or no associated security capabilities (e.g., no authorization, authentication, and/or encryption capabilities) and, as such, such devices are at risk of being attacked by a malicious entity. Thus, while IoT devices offer promising conveniences, they also provide a large number of potential hosts that could be infected by malicious software through network connections. Malicious software (also called malware), such as viruses, worms, Trojans, malicious bots, spyware, ransomware, and adware, can infect various types of electronic devices and can cause a great deal of damage to valuable computer systems and devices.

DESCRIPTION OF EXAMPLE EMBODIMENTS

Overview

Presented herein are techniques for identification and isolation of Internet-of-Things devices in an enterprise network. In an example embodiment, a method includes detecting a plurality of devices having a first network interface to connect to a wireless wide area network and a second network interface to connect to an enterprise network. The method also includes identifying a first subset of the plurality of devices as Internet-of-Things (IoT) devices based on at least a detected repetition rate on a physical random access channel of a transmission made by a device of the plurality of devices. The method includes assigning the IoT devices to a separate network segment within the enterprise network.

Example Embodiments

Large numbers of IoT devices, such as vending machines, digital signage, smart lights, etc., which are being deployed in enterprise networks include dedicated wireless wide area network (WWAN) interfaces or channels (e.g., using 5G, 4G, and/or LTE communication networks) to communicate with IoT servers over the Internet. These WWAN interfaces on the IoT devices are mainly used by the IoT vendors for firmware upgrades, usage analytics, and maintenance purposes. For example, vendors of IoT devices located in elevators may use such WWAN interfaces to collect analytics for proactive maintenance purposes, due to the high costs of on-demand elevator maintenance.

Most of these IoT devices are also connected to the enterprise network using a wireless or wired interface (e.g., WiFi). These IoT devices which are connected to the enterprise network on one interface and connected to the Internet over another interface potentially open a backdoor loophole to the enterprise network and present a security issue for the enterprise network. The enterprise network does not control the communication over the WWAN interfaces on these IoT devices and does not receive visibility of the health or connectivity status for the IoT devices. As a result, any malicious or hacked IoT device can potentially cause significant damage to the security of the enterprise network.

Another potential challenge with identifying IoT devices in an enterprise network is identifying and/or isolating such devices from mobile devices used by authorized users of the enterprise network which are managed by the enterprise network (e.g., using mobile device management solutions). These authorized mobile devices and the IoT devices share the common characteristic of having two interfaces, one for the WWAN and another for the enterprise network. However, while the mobile devices can be managed by the enterprise network (i.e., visibility and control), the IoT devices typically do not have identification or control by the enterprise network.

According to the example embodiments presented herein, techniques are provided to identify such IoT devices, isolate or separate these IoT devices from authorized mobile devices, and take action to quarantine or put these IoT devices in a separate, isolated segment within the enterprise network.

The techniques described herein are applicable to LTE/4G/5G IoT devices and sensors (including narrow-band IoT out-of-band devices and sensors) that are deployed in enterprise networks and may be at risk for providing backdoor access for attacking the enterprise network's security.

Figure 1:
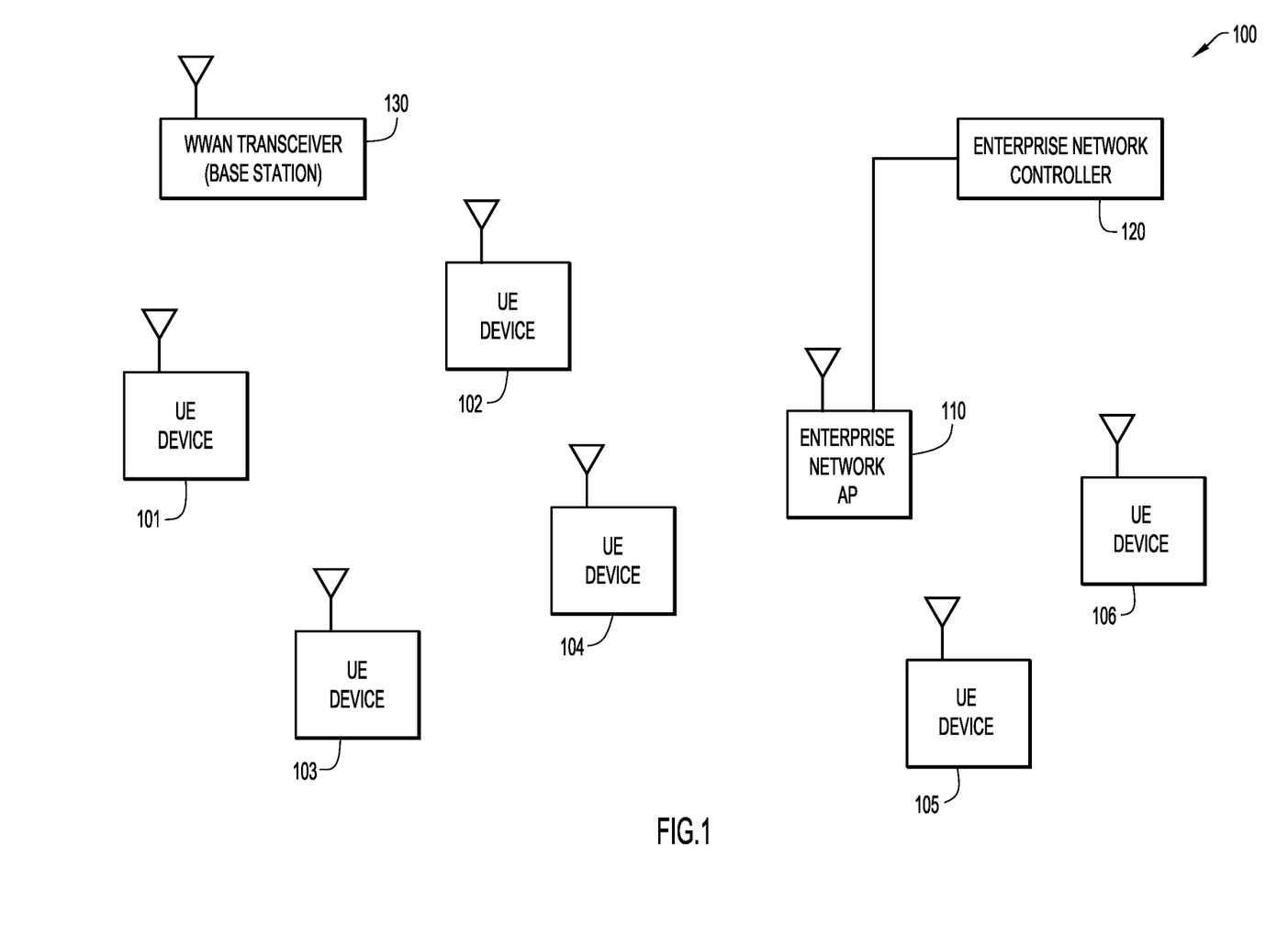
FIG. 1 is a diagram illustrating an enterprise network in which techniques for identification and isolation of Internet-of-Things (IoT) devices may be implemented, according to an example embodiment.

FIG. 1 is a diagram illustrating an enterprise network 100 in which techniques for identification and isolation of IoT devices may be implemented according to an example embodiment. In one embodiment, enterprise network 100 includes a plurality of devices that have a first network interface to connect to a wireless wide area network (WWAN) and a second network interface to connect to enterprise network 100. In this embodiment, the plurality of devices include at least a first device 101, a second device 102, a third device 103, a fourth device 104, a fifth device 105, and a sixth device 106. Plurality of devices 101, 102, 103, 104, 105, 106 may include any user equipment or other devices configured to communicate over a WWAN using one network interface and over the enterprise network 100 using another network interface.

Examples of plurality of devices 101, 102, 103, 104, 105, 106 may include, but are not limited to: mobile devices, cell phones, tablets, printers, computers, consumer electronics, IoT devices, as well as other devices that include equipment to establish a connection with both enterprise network 100 and a WWAN. Additionally, in some embodiments, enterprise network 100 may include other devices that are part of enterprise network 100, but which do not have a network interface that permits them to communicate with the WWAN.

In an example embodiment, enterprise network 100 includes a wireless access device 110, such as a wireless access point (AP), for a wireless local area network (WLAN) associated with enterprise network 100. One or more of plurality of devices 101, 102, 103, 104, 105, 106 may be connected to enterprise network 100 through wireless access device 110. In other embodiments, any of plurality of devices 101, 102, 103, 104, 105, 106 may be connected to enterprise network 100 through a wired connection.

In this embodiment, enterprise network 100 also includes a network controller 120. Network controller 120 is configured to provide management and control of enterprise network 100, including wireless access device 110. In various embodiments, network controller 120 may be implemented in hardware, software, or a combination of both. For example, network controller 120 may be a dedicated apparatus and/or a virtual machine executed in software on an apparatus.

As described above, plurality of devices 101, 102, 103, 104, 105, 106 each include a network interface to allow communication with enterprise network 100. Additionally, plurality of devices 101, 102, 103, 104, 105, 106 also include another network interface to allow communication with the WWAN via a WWAN transceiver (base station) 130. In some embodiments, the WWAN may be configured in compliance with $4^{th}$ generation (4G), Long-Term Evolution (LTE), and/or $5^{th}$ generation (5G) wireless wide area network specifications. In this embodiment, plurality of devices 101, 102, 103, 104, 105, 106 are connected to the WWAN through WWAN transceiver 130, which allows any of these devices to communicate with remote servers (e.g., an IoT server) or other destinations via the Internet outside of enterprise network 100.

In this embodiment, plurality of devices 101, 102, 103, 104, 105, 106 include some devices which may be IoT devices, as well as some devices which may be authorized mobile devices. While the authorized mobile devices can be managed by network controller 120 of enterprise network 100 (e.g., using mobile device management solutions) to provide visibility and/or control of communications over the WWAN network interfaces, the IoT devices are not subject to this same level of visibility and/or control.

When IoT devices are communicating outside of enterprise network 100 (i.e., through WWAN via WWAN transceiver 130), the IoT devices do not proactively communicate these activities with network controller 120. As a result, it follows that network controller 120 cannot directly obtain any identifying information about the IoT devices using their WWAN network interfaces because the identities of these IoT devices are uniquely determined by the WWAN. However, through monitoring of the air environment within enterprise network 100 according to the techniques described herein, for example, using a monitoring radio receiver, network controller 120 can obtain partial information about the WWAN configurations of the IoT devices. For example, the Master Information Block (MIB) and Signal Information Blocks (SIBs) are periodically broadcast by the WWAN base station (e.g., WWAN transceiver 130). Other attributes associated with WWAN, including LTE and narrow-band IoT (an LTE variant), may be decoded and derived by monitoring the air environment within enterprise network 100.

Figure 2:
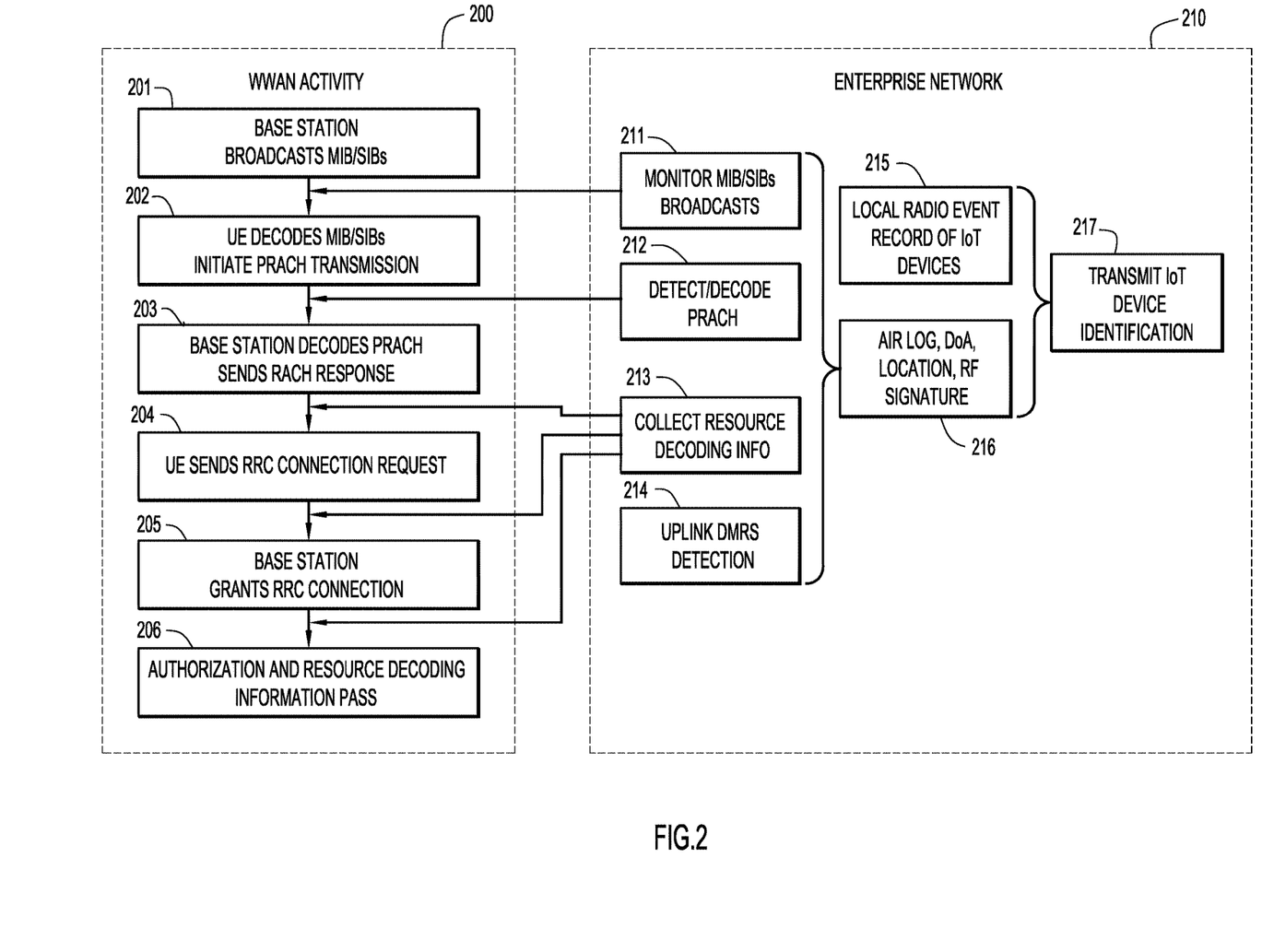
FIG. 2 is a diagram illustrating a process of identifying IoT devices in the enterprise network, according to an example embodiment.

Referring now to FIG. 2, a process of identifying IoT devices in enterprise network 100 is illustrated according to an example embodiment. In this embodiment, operations associated with WWAN activity 200 and operations associated with enterprise network activity 210 are shown as part of the process of identifying IoT devices in enterprise network 100. In this embodiment, network controller 120 of enterprise network 100 may monitor the air environment within enterprise network 100 to identify any WWAN downlink transmissions by a WWAN base station (e.g., WWAN transceiver 130) by searching for primary and secondary synchronization signals. In some embodiments, the air environment may be monitored within enterprise network 100 to detect WWAN transmissions or broadcasts using a monitoring radio receiver, which may be integrated into wireless access device 110 or may be a standalone component of enterprise network 100.

In this embodiment, WWAN activity 200 includes an operation 201 where the WWAN base station (e.g., WWAN transceiver 130) broadcasts MIB and SIBs. Enterprise network activity 210 includes a corresponding operation 211 where MIB and SIBs broadcasts are monitored. At operation 211, when a WWAN downlink transmission is identified, network controller 120 or the monitoring radio receiver may decode the physical broadcast channel (PBCH) and decode system information encoded in MIB and SIBs.

Next, WWAN activity 200 includes an operation 202 where a device of plurality of devices 101, 102, 103, 104, 105, 106 decodes the broadcast MIB and SIBs from operation 201 and initiates a transmission on a physical random access channel (PRACH). In this embodiment, the corresponding enterprise network activity 210 includes an operation 212. At operation 212, based on the decoded system information obtained at operation 211, network controller 120 or the monitoring radio receiver detects and decodes the PRACH transmission from the device.

According to the techniques of the example embodiments, the detected PRACH transmission from the device may be used by network controller 120 or the monitoring radio receiver to determine whether the device of plurality of devices 101, 102, 103, 104, 105, 106 is an IoT device or an authorized mobile device. In an example embodiment, a repetition rate of the transmission made on the PRACH is determined. Depending on the determined repetition rate on the PRACH, an IoT device can be differentiated from authorized mobile devices. IoT devices have a repetition rate for the PRACH transmission from 1, 2, 4, up to 128 times maximum in the uplink direction. Repetitive transmissions from an IoT device (e.g., a narrow-band IoT device) are performed for almost every channel. However, for other devices (e.g., authorized mobile devices having a network interface for connecting to the WWAN), only time and interval bundling is an intentional repetitive transmission, all other transmissions are intended for single repetition only and not multiple repetitions. That is, if at operation 212, a repetition rate of at least one and up to 128 is determined for the PRACH transmission, then the device of plurality of devices 101, 102, 103, 104, 105, 106 is identified as an IoT device.

WWAN activity 200 further includes an operation 203 where the WWAN base station (e.g., WWAN transceiver 130) decodes the PRACH and sends a response transmission on a random access channel (RACH) to the device. At an operation 204, the device sends a radio resource control (RRC) connection request to the WWAN base station (e.g., WWAN transceiver 130) and at an operation 205, the base station grants the RRC connection request. At an operation 206, authorization and resource decoding information pass between the device and the WWAN base station (e.g., WWAN transceiver 130).

During operations 203, 204, 205, 206 of WWAN activity 200, corresponding enterprise network activity 210 includes an operation 213 where network controller 120 or the monitoring radio receiver collects the resource and decoding information that is passing between the device and the WWAN base station. For example, at operation 213 the temporary device identifier may be obtained. At an operation 214, network controller 120 or the monitoring radio receiver may also detect a demodulation reference signal (DMRS) in the uplink transmission between the device and the WWAN base station (e.g., WWAN transceiver 130).

In this embodiment, enterprise network activity 210 also includes a local radio event record (RER) for plurality of devices 101, 102, 103, 104, 105, 106. Because all of plurality of devices 101, 102, 103, 104, 105, 106 are managed by network controller 120 within enterprise network 100, network controller 120 has access to their RERs, in which information associated with radio utilization and the state of plurality of devices 101, 102, 103, 104, 105, 106 is logged or recorded. Additionally, at an operation 216, network controller 120 or the monitoring radio receiver may also include information about the device obtained through the captured uplink transmissions. This information obtained at operation 216 may include, but is not limited to: direction of arrival (DoA), location information, radio frequency (RF) signature or fingerprinting, and other information obtained by the monitoring radio receiver.

Figure 3:
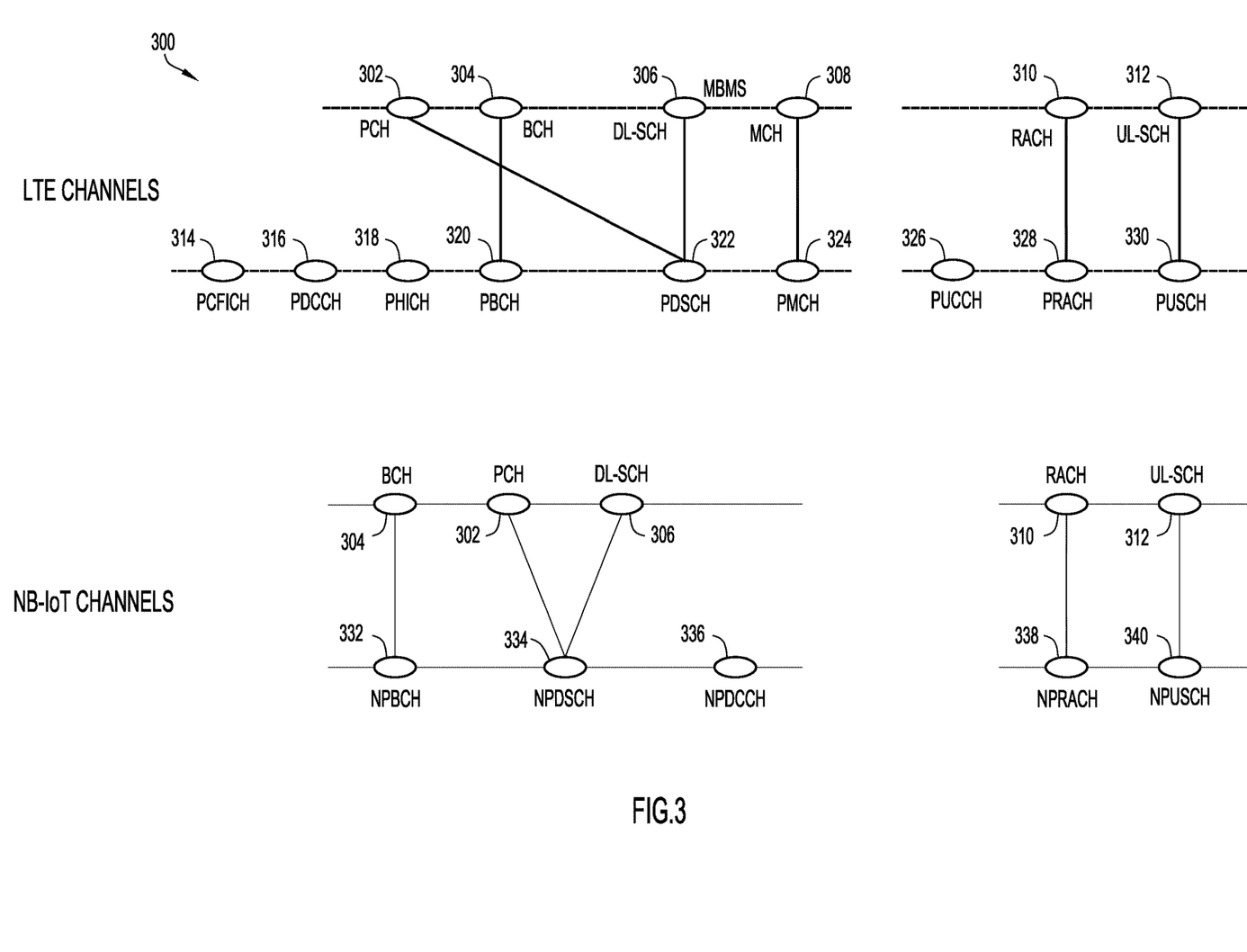
FIG. 3 is a diagram illustrating wireless communication channels used by devices in the enterprise network, according to an example embodiment.

FIG. 3 illustrates wireless communication channels 300 that may be used by devices in enterprise network 100, according to an example embodiment. In this embodiment, the monitoring radio receiver associated with enterprise network 100 may monitor communications over one or more of wireless communication channels 300, including channels used by the WWAN base station (e.g., WWAN transceiver 130), authorized mobile devices, and/or IoT devices. As shown in FIG. 3, wireless communication channels 300 include: Paging Channel (PCH) 302, Broadcast Channel (BCH) 304, Downlink Shared Channel (DL-SCH) 306, Multicast Channel (MCH) 308, RACH 310, Uplink Shared Channel (UL-SCH) 312. Wireless communication channels 300 also include: Physical Control Format Indicator Channel (PCFICH) 314, Physical Downlink Control Channel (PDCCH) 316, Physical Hybrid-ARQ Indicator Channel (PHICH) 318, PBCH 320, Physical Downlink Shared Channel (PDSCH) 322, Physical Multicast Channel (PMCH) 324, Physical Uplink Control Channel (PUCCH) 326, PRACH 328, and Physical Uplink Shared Channel (PUSCH) 330.

Additionally, narrow-band IoT devices include specific channels within existing WWAN specifications that are defined for narrow-band IoT device uses. The channels within wireless communication channels 300 include: Narrowband Physical Broadcast Channel (NPBCH) 332. Narrowband Physical Downlink Shared Channel (NPDSCH) 334, Narrowband Physical Downlink Control Channel (NPDCCH) 336, Narrowband Physical Random Access Channel (NPRACH) 338, and Narrowband Physical Uplink Shared Channel (NPUSCH) 340.

For example, attributes and information that may be decoded or derived by the monitoring radio receiver based on wireless communication channels 300 include: PDCCH where the WWAN base station (e.g., WWAN transceiver 130) informs the devices when to expect their downlink data and when/how to transmit the data to the WWAN base station; PDSCH which is used for sending data to the devices and broadcasting SIBs and is used by the WWAN base station to broadcast data to IoT devices from an IoT vendor's server or cloud; PHICH is a feedback channel to provide Hybrid Automatic Repeat Requests (HARQ) acknowledgements (ACK/NACK) for uplink data transfers to tell the devices which uplink transport blocks need to be retransmitted; and out-of-band (OOB) transmissions by the device to report HARQ feedback and Channel Quality Indicator (CQI) values to the WWAN base station using PUCCH or PUSCH.

Figure 4:
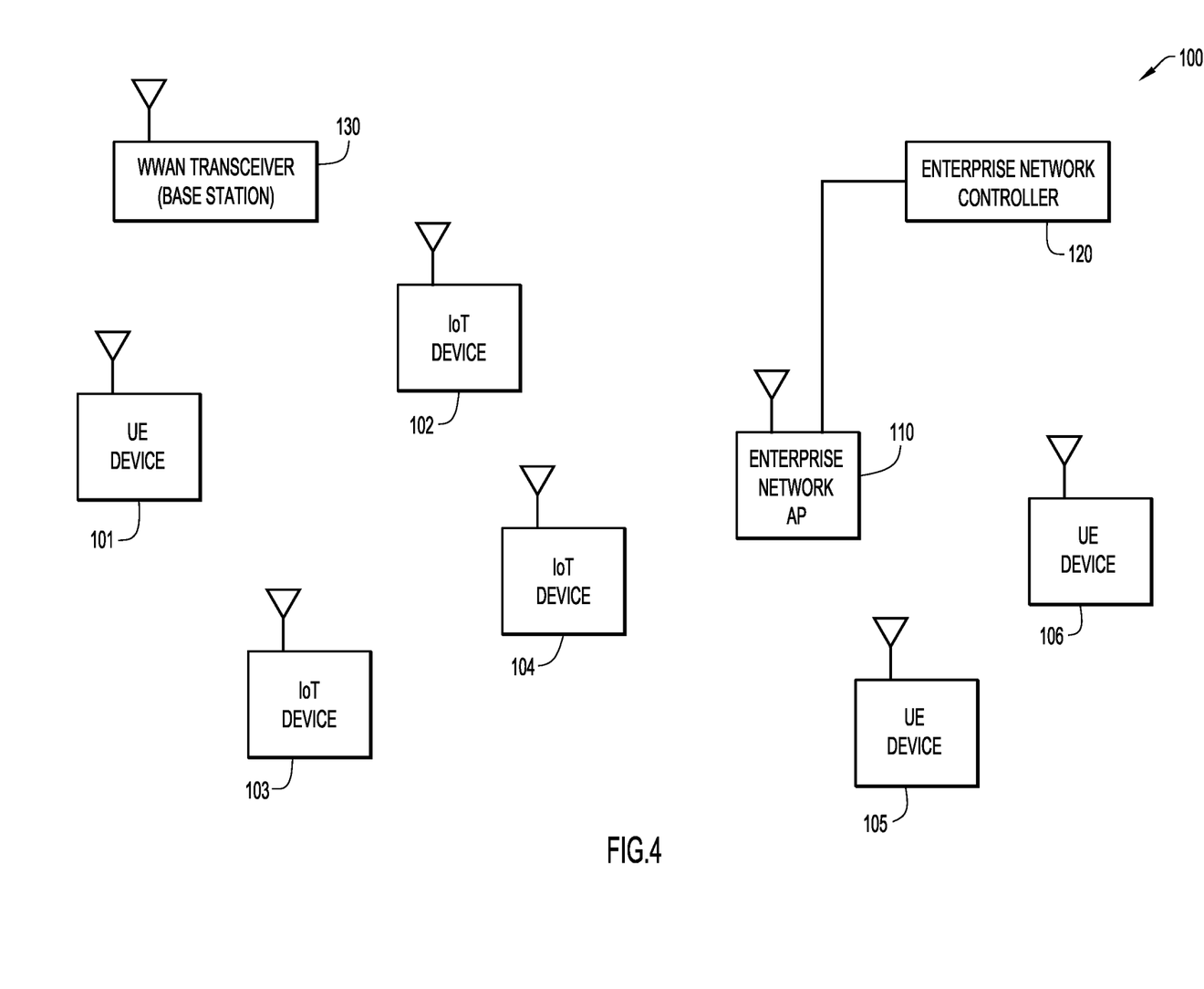
FIG. 4 is a diagram illustrating identified IoT devices in the enterprise network, according to an example embodiment.

FIG. 4 illustrates IoT devices in enterprise network 100 that have been identified using the techniques described herein, according to an example embodiment. In this embodiment, a first subset of plurality of devices 101, 102, 103, 104, 105, 106 have been identified as IoT devices (e.g., narrow-band IoT devices). These identified IoT devices include second device 102, third device 103, and fourth device 104. The first subset of plurality of devices 101, 102, 103, 104, 105, 106 are identified as IoT devices based on at least a detected repetition rate of a PRACH transmission. For example, as described in reference to operation 212 of FIG. 2, where if a repetition rate of at least one and up to 128 is determined for the PRACH transmission, then a device is identified as an IoT device. As shown in FIG. 4, each of second device 102, third device 103, and fourth device 104 has been identified as an IoT device based on a detected repetition rate of a PRACH transmission made by the device.

As described above, network controller 120 has access to the RER information for plurality of devices 101, 102, 103, 104, 105, 106, and may use this information along with the signal information derived from transmissions captured by the monitoring radio receiver to identify IoT devices. Additionally, other characteristics associated with activity in the WWAN (e.g., obtained from wireless communication channels 300) may be used to identify the IoT devices within enterprise network 100. In some embodiments, these characteristics associated with activity in the WWAN include at least a usage pattern associated with the device or a location associated with the device.

In an example embodiment, characteristics associated with a usage pattern of a device may be used to distinguish between IoT devices and authorized mobile devices in enterprise network 100. In an enterprise network environment (e.g., enterprise network 100), IoT devices typically are active at all times throughout a given day. In contrast, authorized mobile devices, such as employee handsets or phones, will typically only be used and active during working hours. In other words, by monitoring device activity and usage during different time periods, these usage patterns may be used to distinguish between IoT devices and other authorized devices.

In one embodiment, a determination that a usage pattern of a device of plurality of devices 101, 102, 103, 104, 105, 106 includes received or sent transmissions over the WWAN network interface (i.e., outside of enterprise network 100) that occur outside of a predetermined time period (e.g., a time period associated with typical or regular working hours within enterprise network 100) may be used to identify a device as an IoT device.

Additionally, other characteristics associated with a usage pattern of a device may also be used to identify the IoT devices. For example, transmissions made by IoT devices are typically characterized by low data rate, low bandwidth, low power, and/or low transmission duration. As a result, a usage pattern of a device that includes one or more of these additional characteristics associated with activity in the WWAN may be further used to identify an IoT device in enterprise network 100.

In another example embodiment, characteristics associated with a location of a device may be used to distinguish between IoT devices and authorized mobile devices in enterprise network 100. In an enterprise network environment (e.g., enterprise network 100), IoT devices typically will not change their location within the environment. For example, IoT devices such as printers, vending machines, displays, etc., are usually fixed at a given location within enterprise network 100. In contrast, authorized mobile devices, such as employee handsets or phones, will change locations in enterprise network 100 throughout the day. In other words, by monitoring device location, this location information may be used to distinguish between IoT devices and other authorized devices.

For example, identifier information for both IoT devices and authorized mobile devices and associated movement and/or location data within enterprise network 100 may be obtained by decoding uplink transmissions of plurality of devices 101, 102, 103, 104, 105, 106 detected by the monitoring radio receiver. This information may be provided to network controller 120 to track movement of plurality of devices 101, 102, 103, 104, 105, 106. A determination that a location associated with a device of plurality of devices 101, 102, 103, 104, 105, 106 does not change may be used to identify the device as an IoT device.

Figure 5:
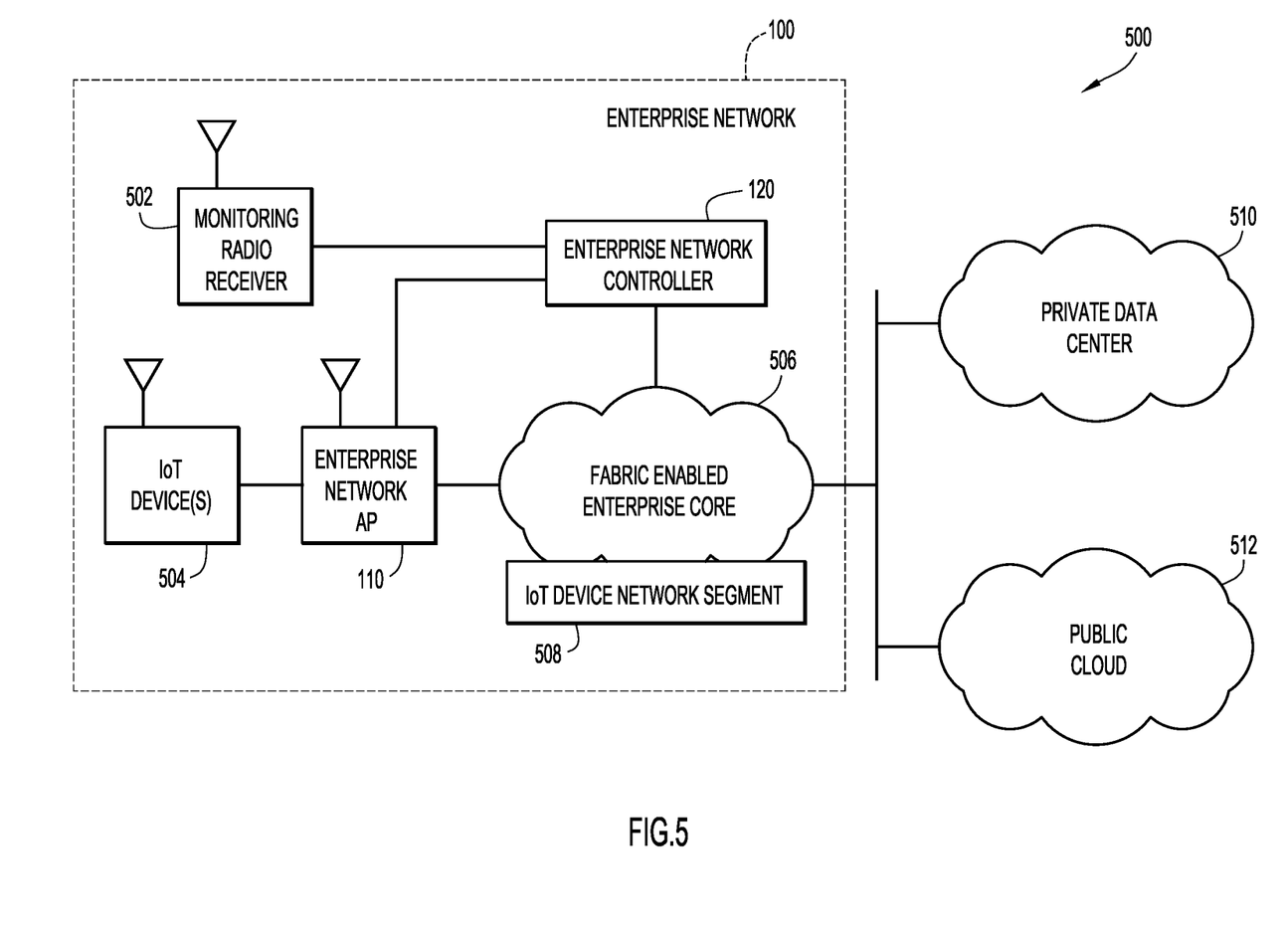
FIG. 5 is a diagram illustrating isolation of IoT devices to a separate network segment in the enterprise network, according to an example embodiment.

After network controller 120 identifies which devices of plurality of devices 101, 102, 103, 104, 105, 106 are IoT devices (e.g., second device 102, third device 103, and fourth device 104 as shown in FIG. 4), network controller 120 may take action to quarantine or assign the identified IoT devices to a separate segment within enterprise network 100. FIG. 5 is a diagram illustrating isolation of IoT devices to a separate network segment in enterprise network 100, according to an example embodiment.

As shown in FIG. 5, an environment 500 includes enterprise network 100 and one or more outside networks, including a private data center 510 (e.g., which may be associated with an IoT vendor) and a public cloud (e.g., a cloud storage service). Enterprise network 100 includes network controller 120, wireless access device 110, and a monitoring radio receiver 502. As described above, in some embodiments, monitoring radio receiver 502 or functions thereof may be incorporated into wireless access device 110.

In this embodiment, one or more IoT devices 504 have been identified in accordance with the techniques described herein. For example, identified IoT devices 504 may include second device 102, third device 103, and fourth device 104 as shown in FIG. 4. IoT devices 504 are connected via a network interface to enterprise network 100 through a wireless or wired connection. For example, IoT devices 504 may be connected to enterprise network 100 through wireless access device 110 or a switch.

In this embodiment, once IoT devices 504 are identified, network controller 120 may provide instructions to wireless access device 110 to assign IoT devices 504 to a separate network segment 508 of enterprise network 100. In an example embodiment, network segment 508 is a virtual extensible local area network (VxLAN). With this arrangement, IoT devices 504 are isolated or quarantined within network segment 508 and are separated from a fabric-enabled enterprise network core 506. By assigning IoT devices 504 to their own network segment 508 apart from fabric-enabled enterprise network core 506 within enterprise network 100, security risks associated with potential backdoor access to enterprise network 100 through the WWAN network interfaces of IoT devices 504 are reduced and minimized.

Additionally, the techniques described herein for identifying IoT devices and assigning them to their own separate network segment may be automated based on detection of one or more new IoT devices within enterprise network 100. For example, a CQI obtained from detected and decoded WWAN transmissions (e.g., using monitoring radio receiver 502) may be compared with previous values of CQI using linear regression or machine-learning based techniques by network controller 120 to determine if the CQI is deteriorating because of new, unknown IoT devices or because of authorized mobile devices. Such CQI data points may be displayed on a display or dashboard associated network controller 120 to provide information or notice to an administrator or other supervising entity for enterprise network 100.

Figure 6:
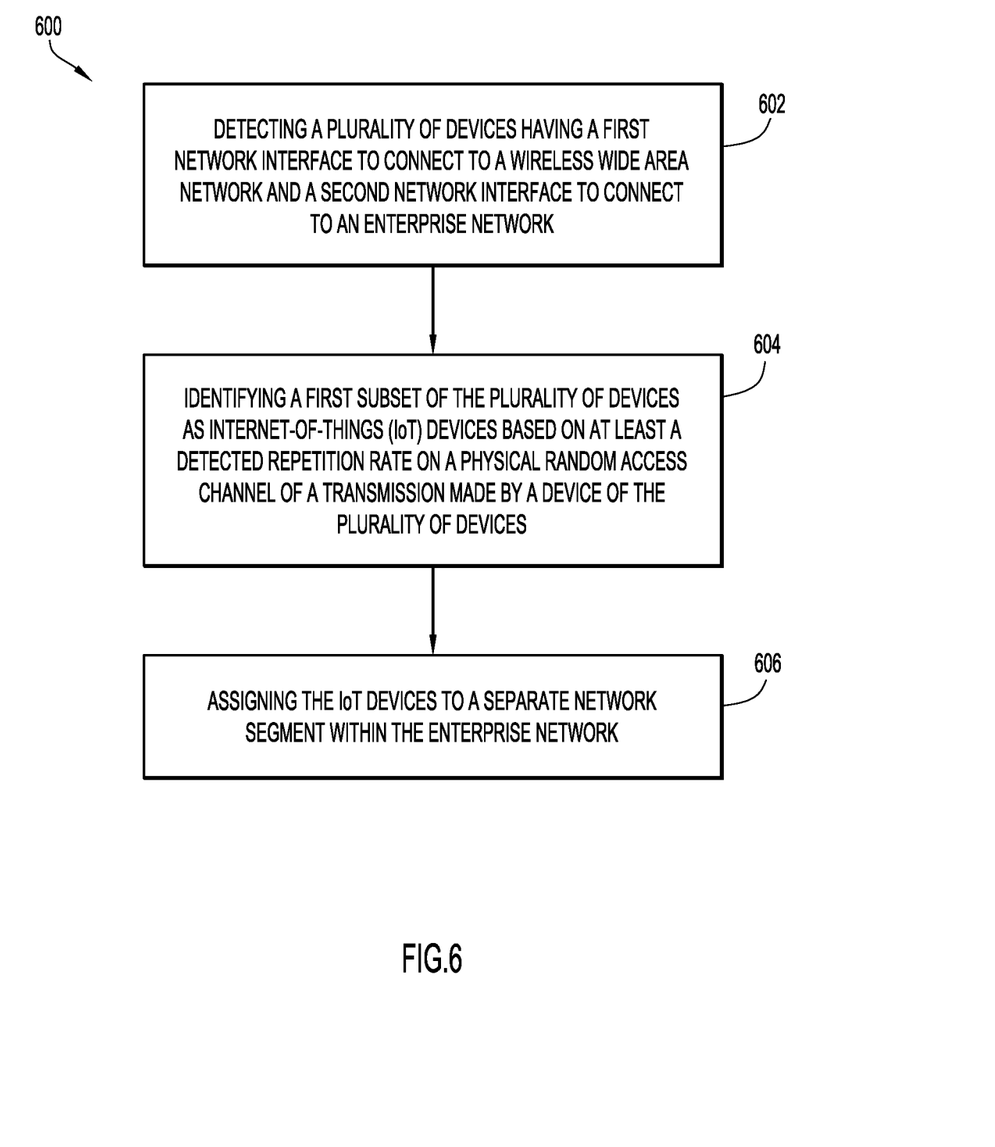
FIG. 6 is a flowchart of a method for identification and isolation of IoT devices in an enterprise network, according to an example embodiment.

FIG. 6 is a flowchart of a method 600 for identification and isolation of IoT devices in an enterprise network, according to an example embodiment. In an example embodiment, method 600 may be implemented by wireless access device 110 and/or network controller 120. In this embodiment, method 600 may begin at an operation 602, where a plurality of devices having a first network interface to connect to a WWAN and a second network interface to connect to an enterprise network are detected. For example, as described above, plurality of devices 101, 102, 103, 104, 105, 106 having a first network interface to connect to a WWAN (e.g., through WWAN transceiver 130) and a second network interface to connect to enterprise network 100 (e.g., through wireless access device 110) are detected.

Next, at an operation 604, a first subset of the plurality of devices are identified as IoT devices based on at least a detected repetition rate on a physical random access channel of a transmission made by a device of the plurality of devices. In some embodiments, at operation 604 a monitoring radio receiver (e.g., integrated into wireless access device 110 and/or standalone monitoring radio receiver 502) detects a repetition rate of a PRACH transmission to identify a device as an IoT device. For example, as described above in reference to FIG. 4, a first subset of plurality of devices 101, 102, 103, 104, 105, 106 are identified as IoT devices (i.e., second device 102, third device 103, and fourth device 104) based on at least a detected repetition rate of a PRACH transmission.

Upon identifying the IoT devices in the enterprise network, method 600 further includes an operation 606. At operation 606, the identified IoT devices (e.g., the first subset of the plurality of devices identified at operation 604) are assigned to a separate network segment within the enterprise network. For example, as shown in FIG. 5, once IoT devices 504 are identified, network controller 120 may provide instructions to wireless access device 110 to assign IoT devices 504 to a separate network segment 508 of enterprise network 100. In one embodiment, network segment 508 may be a virtual extensible local area network (VxLAN).

In some embodiments, method 600 may be implemented upon detection or identification of new devices communicating within the enterprise network. In other embodiments, method 600 may be implemented periodically (e.g., at a regular time interval). Method 600 provides techniques to identify and isolate IoT devices in an enterprise network. With this arrangement, IoT devices are isolated or quarantined within their own network segment (e.g., network segment 508) and are separated from the rest of the enterprise network (e.g., separated from fabric-enabled enterprise network core 506). By assigning the IoT devices to their own network segment apart from the rest of enterprise network 100, security risks associated with potential backdoor access to enterprise network 100 through the WWAN network interfaces of the IoT devices are reduced and minimized.

Figure 7:
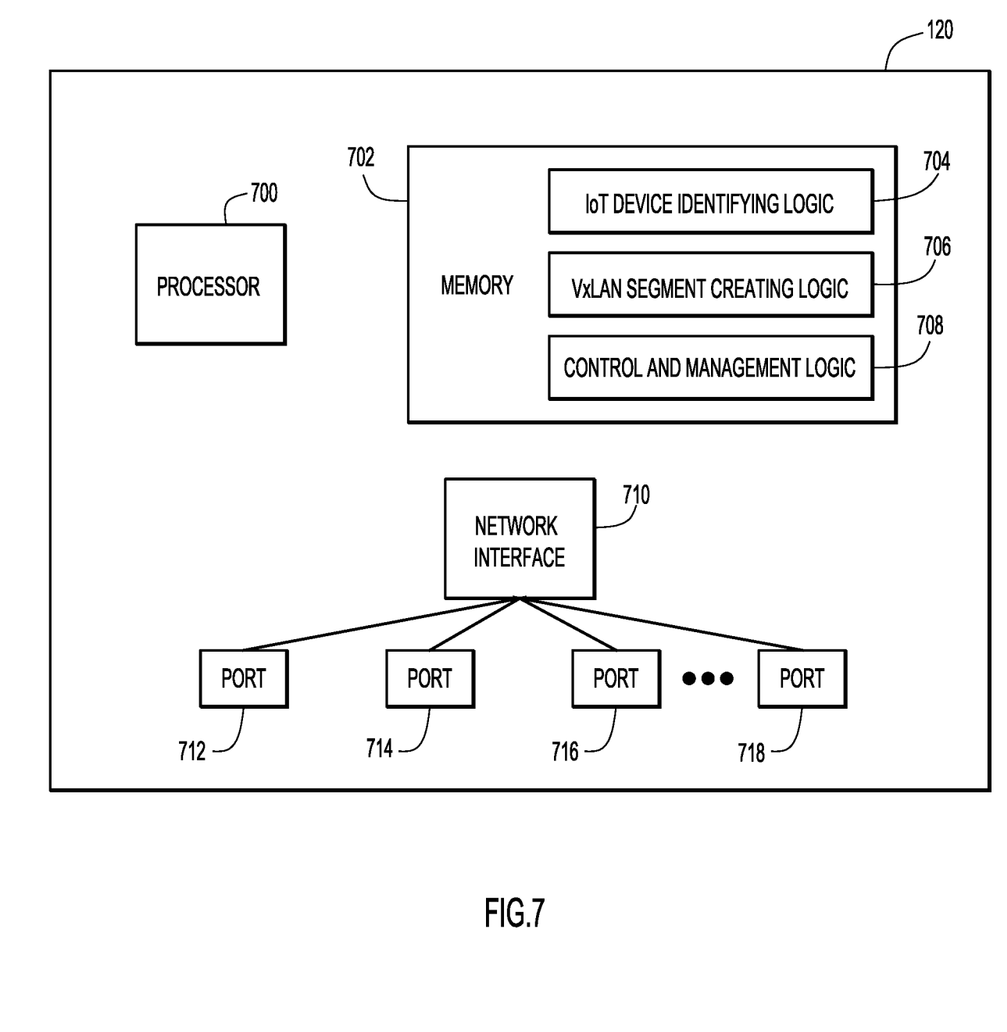
FIG. 7 is a block diagram of a network controller in which the operations for identification and isolation of IoT devices in the enterprise network may be implemented, according to an example embodiment.

FIG. 7 illustrates an example block diagram of a network controller (e.g., network controller 120) that may be configured to implement techniques to identify and isolate IoT devices in an enterprise network according to the principles of the embodiments described herein.

In this embodiment, network controller 120 may include a processor 700 for processing information and may further include a bus (not shown) or other communication mechanism coupled with processor 700 for communicating the information. Network controller 120 may also include a memory 702 that stores instructions for execution by processor 700, and a network interface 710. Network interface 710 may include a plurality of ports 712, 714, 716, 718 to provide connections to allow and communication with a plurality of devices, access points, and other components of enterprise network (e.g., plurality of devices 101, 102, 103, 104, 105, 106, wireless access device 110, IoT devices 504, and/or monitoring radio receiver 502). While the figure shows a single block for processor 700, it should be understood that the processor 700 may represent a plurality of processing cores, each of which can perform separate processing.

In this embodiment, memory 702 may be read only memory (ROM), random access memory (RAM), magnetic disk storage media devices, optical storage media devices, flash memory devices, electrical, optical, or other physical/tangible memory storage devices. Thus, in general, memory 702 may comprise one or more tangible (non-transitory) computer readable storage media (e.g., a memory device) encoded with software comprising computer executable instructions and when the software is executed (by the processor 700) it is operable to perform the operations described herein. For example, one or more of IoT device identifying logic 704, VxLAN segment creating logic 706, and control and management logic 708 is stored in memory 702 for providing one or more of the functions of network controller 120 described herein.

For example, IoT device identifying logic 704 may cause network controller 120 to perform operations associated with detecting transmissions from devices in the enterprise network and identifying them as IoT devices as described above in connection with FIGS. 1-6 when executed by processor 700 from memory 702. VxLAN segment creating logic 706 may cause network controller 120 to perform operations associated with assigning and isolating the identified IoT devices into their own separate network segment, as described above in connection with FIGS. 5 and 6, when executed by processor 700 from memory 702.

In some embodiments, memory 702 may also store instructions for control and management logic 708, that when executed by the processor 700, cause the processor to perform the software defined network controller operations described herein, including operations associated with control and management of enterprise network 100, including plurality of devices 101, 102, 103, 104, 105, 106, wireless access device 110, IoT devices 504, and/or monitoring radio receiver 502.

The techniques described herein provide a mechanism to more efficiently detect and identify IoT device uplink transmissions using captured control signaling information. The principles of the example embodiments described herein allow identification of IoT devices in an enterprise deployment (with an out-of-band LTE/4G/5G connectivity), isolate these IoT devices from authorized mobile devices, and take action to quarantine or isolate the IoT devices within their own network segment.

With the growing number of IoT devices in enterprise networks, out-of-band WWAN communication (via LTE/4G/5G interfaces) is creating an increasing security risk for enterprise networks. The example embodiments described herein provide techniques to detect and isolate such IoT devices in a way to reduce or minimize these security risks.

In summary, a method is provided comprising: detecting a plurality of devices having a first network interface to connect to a wireless wide area network and a second network interface to connect to an enterprise network; identifying a first subset of the plurality of devices as Internet-of-Things (IoT) devices based on at least a detected repetition rate on a physical random access channel of a transmission made by a device of the plurality of devices; and assigning the IoT devices to a separate network segment within the enterprise network.

In some embodiments, detecting comprises monitoring transmissions received and/or sent by the plurality of devices in the wireless wide area network using a monitoring radio receiver.

In some embodiments, monitoring includes monitoring at least one of a Master-Information Block or Signal-Information Blocks.

In some embodiments, identifying the IoT devices is further based on characteristics associated with activity in the wireless wide area network, the characteristics including at least one of: a usage pattern or a location.

In some embodiments, identifying the IoT devices is further based on determining that the usage pattern of a device of the plurality of devices includes received or sent transmissions on the first network interface that occur outside of a predetermined time period.

In some embodiments, identifying the IoT devices is further based on determining that the location associated with a device of the plurality of devices does not change.

In some embodiments, the separate network segment within the enterprise network is a virtual extensible local area network (VxLAN).

In another form, a non-transitory computer readable storage media encoded with instructions is provided that, when executed by a processor of a network controller, cause the processor to: detect a plurality of devices having a first network interface to connect to a wireless wide area network and a second network interface to connect to an enterprise network; identify a first subset of the plurality of devices as Internet-of-Things (IoT) devices based on at least a detected repetition rate on a physical random access channel of a transmission made by a device of the plurality of devices;

and assign the IoT devices to a separate network segment within the enterprise network.

Furthermore, an apparatus is provided comprising: a plurality of network ports configured to communicate with devices in an enterprise network; a memory; a processor coupled to the memory and to the plurality of network ports, wherein the processor is configured to: detect a plurality of devices having a first network interface to connect to a wireless wide area network and a second network interface to connect to the enterprise network; identify a first subset of the plurality of devices as Internet-of-Things (IoT) devices based on at least a detected repetition rate on a physical random access channel of a transmission made by a device of the plurality of devices; and assign the IoT devices to a separate network segment within the enterprise network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   detecting a plurality of devices having a first network interface to connect to a wireless wide area network and a second network interface to connect to an enterprise network;
   monitoring downlink and uplink transmissions for the plurality of devices for the wireless wide area network;
   maintaining a radio event record for the plurality of devices, wherein the radio event record comprises direction of arrival information for the uplink transmissions for the plurality of devices for the wireless wide area network;
   identifying a first subset of the plurality of devices as Internet-of-Things (IoT) devices that are distinguished from authorized mobile devices managed by the enterprise network based, at least in part, on the radio event record and a repetition rate on a physical random access channel of an uplink transmission made by a device of the plurality of devices; and
   assigning the IoT devices to a separate network segment within the enterprise network.

2. The method of claim 1, wherein wherein the monitoring is further performed using a monitoring radio receiver.

3. The method of claim 2, wherein the monitoring includes monitoring at least one of a Master-Information Block or Signal-Information Blocks.

4. The method of claim 1, wherein identifying the IoT devices is further based on characteristics associated with activity in the wireless wide area network, the characteristics including at least one of: a usage pattern or a location.

5. The method of claim 4, wherein identifying the IoT devices is further based on determining that the usage pattern of a device of the plurality of devices includes downlink or uplink transmissions on the first network interface that occur outside of a predetermined time period.

6. The method of claim 4, wherein identifying the IoT devices is further based on determining that the location associated with a device of the plurality of devices does not change.

7. The method of claim 1, wherein the separate network segment within the enterprise network is a virtual extensible local area network (VxLAN).

8. One or more non-transitory computer readable storage media encoded with instructions that, when executed by a processor of a network controller, cause the processor to:
   detect a plurality of devices having a first network interface to connect to a wireless wide area network and a second network interface to connect to an enterprise network;
   monitor downlink and uplink transmissions for the plurality of devices for the wireless wide area network;
   maintain a radio event record for the plurality of devices, wherein the radio event record comprises direction of arrival information for the uplink transmissions for the plurality of devices for the wireless wide area network;
   identify a first subset of the plurality of devices as Internet-of-Things (IoT) devices that are distinguished from authorized mobile devices managed by the enterprise network based, at least in part, on the radio event record and a repetition rate on a physical random access channel of an uplink transmission made by a device of the plurality of devices; and
   assign the IoT devices to a separate network segment within the enterprise network.

9. The one or more non-transitory computer readable storage media of claim 8, wherein the monitoring is performed, at least in part, using a monitoring radio receiver.

10. The one or more non-transitory computer readable storage media of claim 9, wherein the monitoring includes monitoring at least one of a Master-Information Block or Signal-Information Blocks.

11. The one or more non-transitory computer readable storage media of claim 8, wherein identifying the IoT devices is further based on characteristics associated with activity in the wireless wide area network, the characteristics including at least one of: a usage pattern or location.

12. The one or more non-transitory computer readable storage media of claim 11, wherein identifying the IoT devices is further based on determining that the usage pattern of a device of the plurality of devices includes downlink or uplink transmissions on the first network interface that occur outside of a predetermined time period.

13. The one or more non-transitory computer readable storage media of claim 11, wherein identifying the IoT devices is further based on determining that the location associated with a device of the plurality of devices does not change.

14. The one or more non-transitory computer readable storage media of claim 8, wherein the separate network segment within the enterprise network is a virtual extensible local area network (VxLAN).

15. An apparatus comprising:
   a plurality of network ports configured to communicate with devices in an enterprise network;
   a memory;
   a processor coupled to the memory and to the plurality of network ports, wherein the processor is configured to:
      detect a plurality of devices having a first network interface to connect to a wireless wide area network and a second network interface to connect to the enterprise network;
      monitor downlink and uplink transmissions for the plurality of devices for the wireless wide area network;
      maintain a radio event record for the plurality of devices, wherein the radio event record comprises direction of arrival information for the uplink transmissions for the plurality of devices for the wireless wide area network;

identify a first subset of the plurality of devices as Internet-of-Things (IoT) devices that are distinguished from authorized mobile devices managed by the enterprise network based, at least in part on the radio event record and a repetition rate on a physical random access channel of an uplink transmission made by a device of the plurality of devices; and assign the IoT devices to a separate network segment within the enterprise network.

16. The apparatus of claim 15, wherein the monitoring is performed, at least in part, using a monitoring radio receiver.

17. The apparatus of claim 15, wherein the monitoring includes monitoring at least one of a Master-Information Block or Signal-Information Blocks.

18. The apparatus of claim 15, wherein identifying the IoT devices is further based on determining that a usage pattern of a device of the plurality of devices includes downlink or uplink transmissions on the first network interface that occur outside of a predetermined time period.

19. The apparatus of claim 15, wherein identifying the IoT devices is further based on determining that a location associated with a device of the plurality of devices does not change.

20. The apparatus of claim 15, wherein the separate network segment within the enterprise network is a virtual extensible local area network (VxLAN).

* * * * *